United States Patent
Blumenschein et al.

(10) Patent No.: US 6,919,031 B2
(45) Date of Patent: Jul. 19, 2005

(54) METHOD OF TREATING WATER AND WASTEWATER WITH A BALLASTED FLOCCULATION PROCESS AND A CHEMICAL PRECIPITATION PROCESS

(75) Inventors: Charles D. Blumenschein, Pittsburgh, PA (US); Kashi Banerjee, Moon Township, PA (US)

(73) Assignee: I. Kruger Inc., Cary, NC (US)

( * ) Notice: Subject to any disclaimer, the term of this patent is extended or adjusted under 35 U.S.C. 154(b) by 7 days.

(21) Appl. No.: 10/001,208

(22) Filed: Nov. 2, 2001

(65) Prior Publication Data

US 2002/0088758 A1 Jul. 11, 2002

Related U.S. Application Data

(60) Provisional application No. 60/245,408, filed on Nov. 2, 2000.

(51) Int. Cl.[7] .................................................. C02F 1/52
(52) U.S. Cl. ..................... 210/711; 210/713; 210/714; 210/724; 210/726; 210/738; 210/912
(58) Field of Search .......................... 210/631, 702, 210/711, 713, 714, 724, 725, 726, 727, 738, 787, 912

(56) References Cited

U.S. PATENT DOCUMENTS

| | | |
|---|---|---|
| 3,738,932 A | 6/1973 | Kostenbader |
| 4,388,195 A | 6/1983 | Von Hagel et al. |
| 4,927,543 A | 5/1990 | Bablon et al. |
| 4,997,573 A | 3/1991 | Browne |
| 5,039,428 A | 8/1991 | Wentzler et al. |
| 5,453,205 A | 9/1995 | Browne |
| 5,453,206 A | 9/1995 | Browne |
| 5,454,856 A | 10/1995 | Browne |
| 5,456,844 A | 10/1995 | Lobb |
| 5,730,864 A | 3/1998 | Delsalle et al. |
| 5,770,091 A | 6/1998 | Binot et al. |
| 5,800,717 A | 9/1998 | Ramsay et al. |
| 5,840,195 A | 11/1998 | Delsalle et al. |
| 6,010,631 A | 1/2000 | Delsalle et al. |
| 6,210,587 B1 | 4/2001 | Vion |
| 6,277,285 B1 | 8/2001 | Vion |
| 6,485,652 B1 | 11/2002 | Le Poder et al. |

FOREIGN PATENT DOCUMENTS

| | | |
|---|---|---|
| AU | 633305 | 9/1990 |
| AU | 617290 | 11/1991 |
| AU | 618231 | 12/1991 |
| AU | 658875 | 7/1992 |
| AU | 653233 | 1/1993 |
| AU | 666309 | 1/1993 |
| AU | 665774 | 2/1993 |
| AU | 667037 | 4/1997 |
| CA | 1331895 | 6/1994 |
| GB | 467887 | 6/1937 |

*Primary Examiner*—Peter A. Hruskoci
(74) *Attorney, Agent, or Firm*—Coats & Bennett, P.L.L.C.

(57) ABSTRACT

The present invention is directed to a method and apparatus for the treatment of water and wastewater. In one embodiment, a method of treating water according to the present invention includes mixing sludge and precipitant with the water to be treated, mixing ballast with the water, and separating the water into treated water and sludge. Some or all of the separated sludge may be recycled for mixing with the precipitant and water to be treated.

17 Claims, 5 Drawing Sheets

US 6,919,031 B2

METHOD OF TREATING WATER AND WASTEWATER WITH A BALLASTED FLOCCULATION PROCESS AND A CHEMICAL PRECIPITATION PROCESS

This patent application claims priority to U.S. Provisional Patent Application No. 60/245,408, filed Nov. 2, 2000.

FIELD OF THE INVENTION

The present invention relates to an improved process for removing dissolved and suspended solids from water and wastewater, with a subsequent improvement in the dewatering characteristics of the removed solids.

BACKGROUND

In order to utilize water for drinking purposes, or to treat wastewater for discharge, it may be desired to remove various dissolved and suspended constituents. These constituents may include heavy metals, oil and grease, calcium, magnesium, iron, silica, and dissolved and suspended organic material. While the quality of water varies greatly between sources, it almost always has one or more of the above constituents. Removal of these constituents is typically done utilizing a physical/chemical treatment process. This type of process uses a combination of chemical reactions and physical separation processes to separate and remove the constituents from the water in a solid form.

SUMMARY OF THE INVENTION

In one embodiment, the present invention is directed to a method for treating water. The method includes reacting an alkaline reagent with a first sludge to form a treatment slurry and reacting the treatment slurry with a water to form a treated water and suspended solids. The method also includes mixing the treated water and the suspended solids with an insoluble granular material and destabilizing the treated water, the suspended solids and the insoluble granular material. The method further includes flocculating the treated water, the suspended solids and the insoluble granular material and separating the treated water, the suspended solids and the insoluble granular material into clarified water and a second sludge.

In another embodiment, the present invention is directed to a water treatment system including an alkaline reagent mixing chamber provided with an alkaline reagent inlet, a recycle sludge inlet, an agitator and a treatment slurry outlet. The system also includes a reaction chamber connected to the treatment slurry outlet and provided with a water inlet, an agitator and a treated water and suspended solids outlet. The system further includes a flash mix chamber connected to the treated water and suspended solids outlet and provided with an insoluble granular material inlet, an agitator and a treated water, suspended solids and granular insoluble material outlet. The system further includes a flocculation chamber connected to the treated water, suspended solids and granular insoluble material outlet and provided with an agitator and a flocculated water outlet. The system further includes a separator connected to the flocculated water outlet and provided with a clarified liquid outlet and a sludge outlet. Finally, the system includes a sludge recycle connected to the sludge outlet and the recycle sludge inlet; and a sludge discharge connected to the sludge outlet.

In another embodiment, the present invention is directed to a method of treating water. The method includes mixing a first sludge and a precipitant with a water to be treated, mixing a ballast with the water, and separating the water into clarified water and a second sludge.

Other advantages, novel features, and objects of the invention will become apparent from the following detailed description of the invention when considered in conjunction with the accompanying drawings, some of which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

The present invention is directed to a method and apparatus for the treatment of water and wastewater. In one aspect, the invention combines elements of water treatment processes using sludge recycle and elements of processes using ballast into a new method achieving improved efficiency.

Conventional physical/chemical treatment processes may include some or all of the following steps:

Chemical Precipitation: a chemical reaction that changes the solubility of dissolved compounds in the water, resulting in the precipitation of the compounds and the formation of colloid particles;

Coagulation/Flocculation: Destabilization of colloid particles and aggregation of the colloid particles into larger aggregates, thereby converting the particles from a stable suspension to an unstable one;

Sedimentation: Settling of the aggregates and separation of the settled solids from the liquid in the form of sludge;

Thickening: A settling process used to increase the solids content and reduce the water content of sludge removed in the sedimentation process; and Filtration: removal of residual suspended solids in the water through mechanical filtration.

Figure 1:
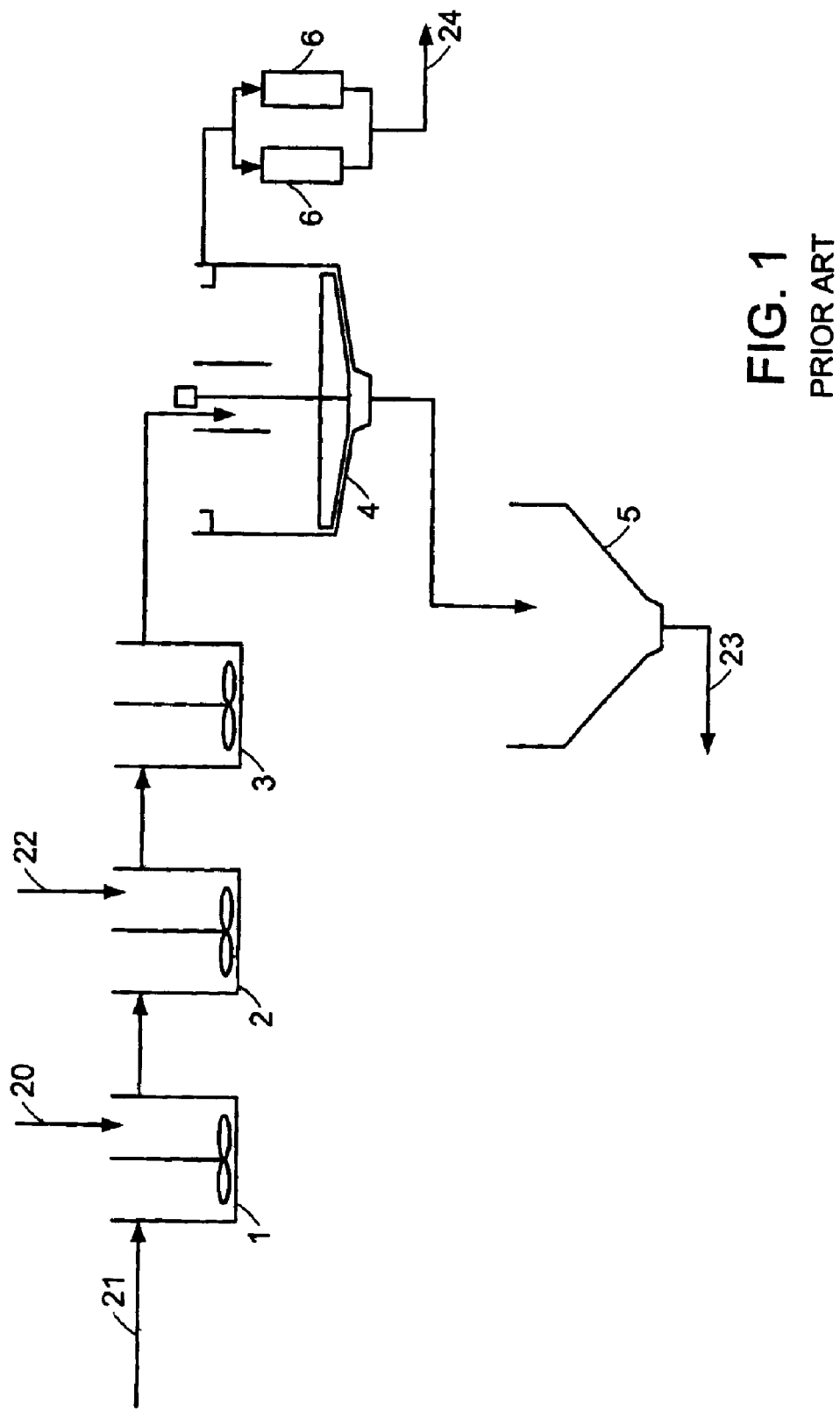
FIG. 1 is a plan view of a prior art treatment process.

A typical prior art physical/chemical treatment process is illustrated in FIG. 1, and consists of a chemical reaction tank 1 into which chemical 20 and water 21 are added, a flash mix tank 2 into which a coagulant 22 is added, a flocculation tank 3, a clarifier 4, a thickener 5 producing concentrated sludge 23, and effluent filters 6 producing treated water 24. This typical system utilizes a significant amount of space for installation, requires purchase and installation of various treatment units and has relatively high operating costs.

Numerous technologies have been developed over the years that are designed to maximize the efficiency and minimize the costs of each of the steps performed in a physical/chemical treatment process. Examples of such designs are disclosed in U.S. Pat. Nos. 4,388,195, 5,039,428, 5,730,864, 5,770,091, 6,210,587, and 6,277,285, which are hereby incorporated by reference in their entirety. The current technologies typically attempt to increase the coagulation and sedimentation rate of the suspended particles in the water. The coagulation and settling rates are influenced by a variety of factors, including the type and density of the particle and the concentration of solids being settled. Typically, increasing the concentration and density of the solids increases the solids settling rate, resulting in smaller equipment sizes, improved effluent quality and increased sludge solids concentration. Particle concentration and/or density is typically increased either through the recycle of settled sludge, or through the addition of a ballast material. These two processes are discussed in more detail below.

Figure 2:
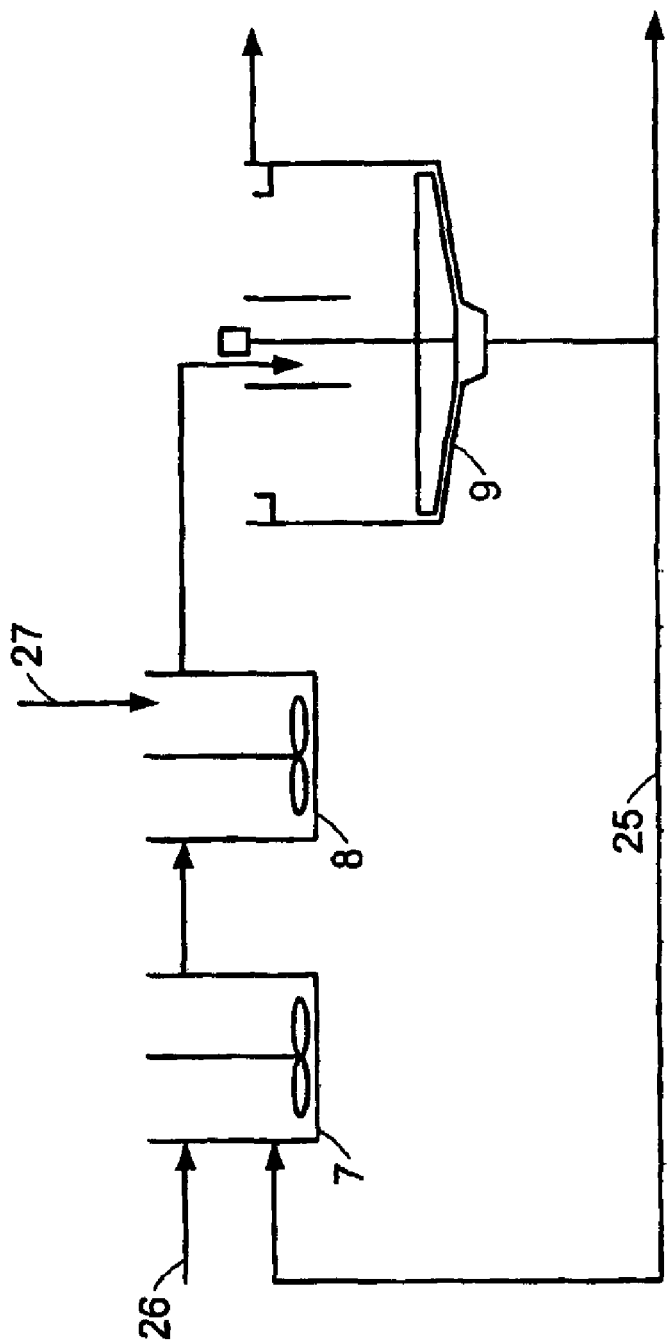
FIG. 2 is a plan view of another prior art treatment process.

An example of collection and recycle of settled sludge is described in U.S. Pat. No. 3,738,932, which is hereby incorporated by reference in its entirety, and is illustrated in FIG. 2. In this process, a portion of the settled sludge 25 from a sedimentation tank 9 is recycled and reacted with an alkaline slurry stream 26 in a mixing vessel 7. The alkaline slurry is typically a lime slurry mixture. The mixed slurry/sludge stream is then added to the water/wastewater stream 27 that is to be treated. The mixture is reacted in a vessel 8 and then flows to the sedimentation step. On a mass basis, the amount of sludge recycled is on the order of twenty times the amount removed. For most compounds, the recycle of sludge back to the alkaline slurry stream results in the formation of a dense solid, which settles and dewaters well. For metal hydroxide sludges, the final dewatered sludge will contain typically 30–50% water, compared to 70% water without the recycle process. This results in a much lower sludge volume that must be handled and disposed.

There are several drawbacks to collection and recycle of settled sludge. First, the process is dependent upon the formation of a sufficient mass of sludge in order to operate effectively. During the initial start-up period, the system operates relatively poorly. This makes the process unsuitable for batch or intermittent treatment processes. Second, while the solids settle well, the settling rate is still well below that obtainable by addition of a ballast material. Therefore, the sedimentation equipment must be larger in size. Finally, the process may result in relatively high levels of very fine particulate suspended solids levels in the effluent water. Depending upon the quality requirements, this may require installation of filtration equipment after the sedimentation system.

Figure 3:
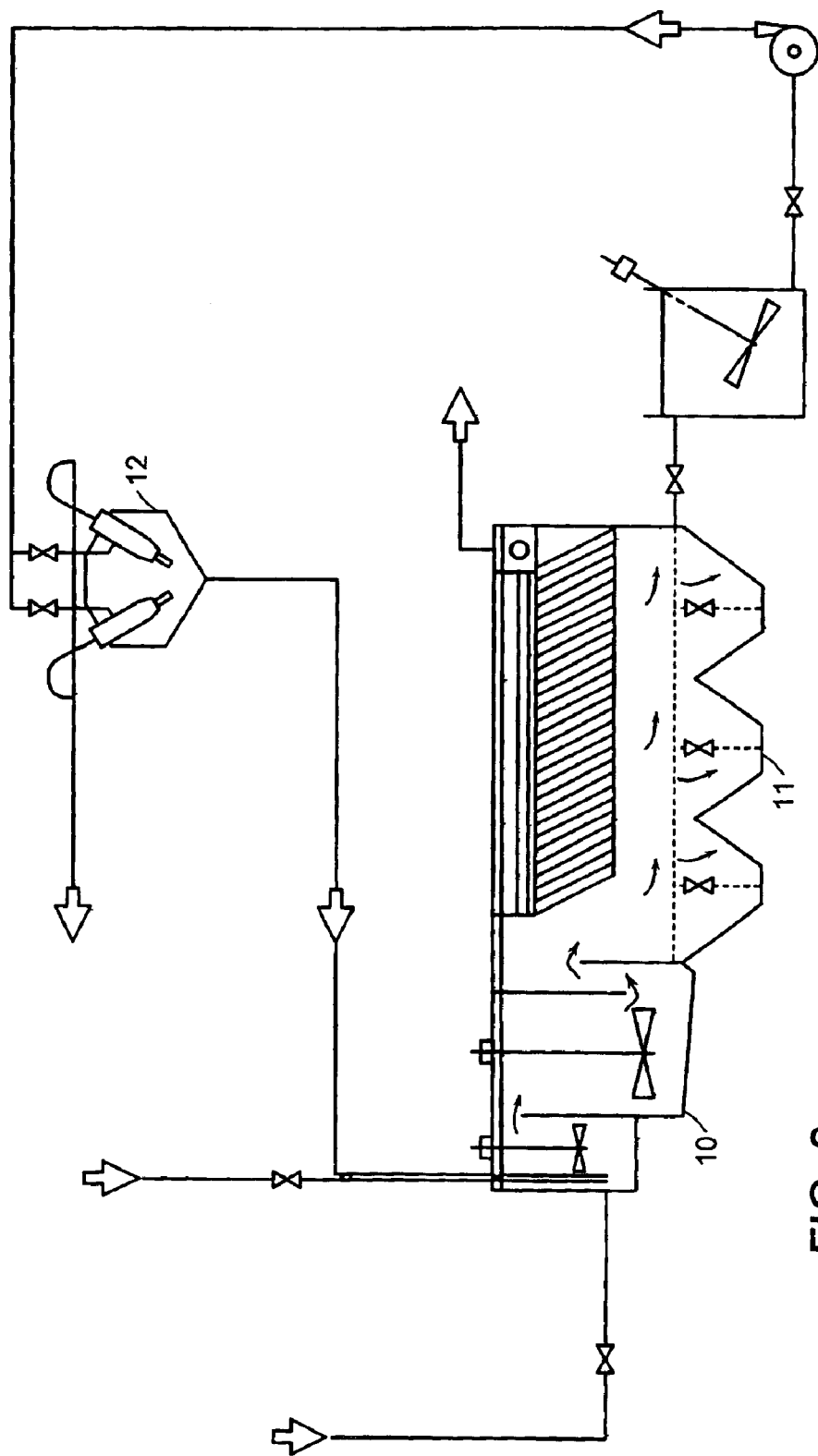
FIG. 3 is a plan view of another prior art treatment process.

In processes using addition of ballast material, an inert granular material, typically sand, is injected into the chemical precipitation step of the treatment process. An example of this process is described in U.S. Pat. No. 4,927,543, which is hereby incorporated by reference in its entirety, and is illustrated in FIG. 3. In this process, the untreated water is mixed with chemicals and ballast material in a reaction tank. The water is then sent to a coagulation tank 10, where the particles aggregate around the ballast material. The water, with the coagulated solids, flows to a sedimentation tank 11, where the solids separate by gravity. The clarified water is discharged and the solids are sent to a separator 12. Separator 12 separates the high-density ballast material from the lower density settled solids. The separator recovers the ballast material for recycle back to the reaction tank. The lower density settled solids are typically sent to additional treatment steps in order to remove water and produce a solid waste for disposal. The ballast material greatly increases the sedimentation rate of the solids, thereby reducing the equipment size required for the sedimentation tank. The process also improves the removal efficiency of the solids, when compared to conventional clarification. However, the ballast/sludge separation step typically produces a low concentration sludge product. It is often necessary to install additional sludge thickening equipment in order to produce a sludge suitable for dewatering and disposal.

In one embodiment, a method of treating water according to the present invention includes mixing sludge and precipitant with the water to be treated, mixing ballast with the water, and separating the water into treated water and sludge. Some or all of the separated sludge may be recycled for mixing with the precipitant and water to be treated. Accordingly, in this embodiment, the present invention combines collection and recycle of sludge with addition of ballast to treat water in a manner never previously done. The combination of these processes has not be achieved before the present, and, as a result, the long-felt, but unaddressed need for improved treatment efficiency has only now been addressed.

Mixing sludge and precipitant with the water to be treated may be performed in any manner and using any materials or equipment that allow precipitation of a contaminant or contaminants. By contaminant, it is meant any material that is desired to be removed from the water to be treated. The precipitant may be any compound, mixture, chemical, solution, or the like, capable of precipitating a contaminant. For example, the precipitant may be a material that lowers the solubility of the contaminant or a material that reacts with the contaminant to form a material less soluble than the contaminant.

In one example embodiment of the invention, the precipitant is an alkaline reagent. The alkaline reagent may be any material having a pH greater than about 7 capable of interacting with the sludge and the water to precipitate a contaminant. For example, the alkaline reagent may include an aqueous slurry of calcium hydroxide ($Ca(OH)_2$) or magnesium hydroxide ($Mg(OH)_2$). As an alternate example, the alkaline reagent may be an aqueous solution of sodium hydroxide (NaOH). In embodiments where softening may be desired, a softener, such as soda ash ($Na_2CO_3$), may be added as an additional precipitant. In some embodiments, materials that improve precipitation, but are not necessarily precipitants, may be added with the precipitant. For example, a material that improves the performance of a precipitant may be added.

Any amount of precipitant may be mixed with the sludge and water so long as there is sufficient precipitation of the material desired to be removed from the water for a particular treatment application. The preferred amount of precipitant for a particular embodiment may vary with the precipitant, contaminant type and concentration, and the like, and may be selected by the exercise of ordinary skill in the art. Where precipitant is not added in pure form, for example where the precipitant is an alkaline reagent in slurry form, the concentration of precipitant reacted with the sludge and water may vary with the precipitant and manner of its addition. Higher concentrations of precipitant are generally preferred because such concentrations may reduce the required size of equipment used to perform the mixing and the hydraulic flow rate in downstream equipment.

The water to be treated may be any water from which a contaminant may be precipitated by a precipitant. In one embodiment, the water to be treated may be an acidic wastewater containing dissolved metals. In this embodiment, the precipitant, which may be an alkaline reagent, may neutralize the acidity of the water, resulting in the precipitation of metal hydroxides and/or metal oxides. If iron is one of the metals present, an additional precipitant, such as oxygen, may be added in order to convert the iron from the ferrous ($Fe^{+2}$) to the ferric ($Fe^{+3}$) form, which is substantially less soluble than the ferrous form, resulting in better precipitation.

In another embodiment, the water to be treated may contain relatively high concentrations of calcium and magnesium. These two compounds are responsible for hardness in water. High levels of hardness may cause various adverse affects when the water is utilized for either potable or non-potable uses. Calcium and magnesium may be removed through chemical precipitation by the precipitant, which, in this embodiment, may be an alkaline reagent or soda ash. The calcium may be precipitated as calcium carbonate ($CaCO_3$) and the magnesium may be precipitated as magnesium hydroxide ($Mg(OH)_2$). The reactions involved in the softening process are as follows:

$$H_2CO_3 + Ca(OH)_2 \rightarrow CaCO_3(s) + 2H_2O$$

$$Ca_2^+ + 2HCO_3^- + Ca(OH)_2 \rightarrow 2CaCO_3(s) + 2H_2O$$

$$Ca^{2+} + Na_2CO_3 \rightarrow CaCO_3(s) + 2Na^+$$

$$Mg^{2+} + 2HCO_3^- + 2Ca(OH)_2 \rightarrow 2CaCO_3(s) + Mg(OH)_2(s) + 2H_2O$$

$$Mg^{2+} + Ca(OH)_2 \rightarrow Mg(OH)_2(s) + Ca^+$$

$$Ca^{2+} + Na_2CO_3 \rightarrow CaCO_3(s) + 2Na^+$$

These precipitation reactions are similar to those described above for metal precipitation, however, soda ash may also be used to facilitate magnesium removal.

Other dissolved constituents present in water or wastewater may be removed by the present invention. For example, dissolved silica may be removed by use of an appropriate precipitant. For example, aluminum and iron containing compounds, such as salts thereof, have been found to be effective precipitants for silica. Suitable compounds include ferric sulfate, ferric chloride and aluminum hydroxide. Any amount of iron or aluminum containing compounds may be added that precipitate the desired amount of silica. The amount of iron or aluminum containing compounds added may be proportional to the amount of silica to be precipitated. For example, in one embodiment, about 3 to about 5 grams of aluminum containing compounds, or about 5 to about 10 grams of iron containing compounds, may be added for each gram of silica desired to be precipitated. These precipitants may also be combined with other precipitants, such as an alkaline reagent and, in some cases, may produce synergistic effects. As another example, fluoride has been found to be able to be precipitated by calcium chloride, which may also be suitable as a precipitant for other materials. Accordingly, it should be understood that the specific embodiments disclosed herein are by way of example and are not intended to identify all potential constituents that may be removed, nor all the precipitants that may facilitate such removal.

Whatever the nature of the water to be treated and related precipitation reaction, the precipitated compounds may be adsorbed onto sludge particles, forming crystalline particles. These crystalline particles may settle faster, dewater more readily and hold less water than solids formed from a conventional precipitation process not using recycled sludge. The crystalline particles also may be smaller, with a much narrower size range than conventional precipitation particles. The particle size distribution for the crystalline particles is typically in the range of about 1 to about 8 microns, versus a range of about 1 to about 45 microns for conventional precipitation particles. These smaller, more uniform particles also may be capable of flocculating into much more compact, dense agglomerations, thereby resulting in the improved settling and dewatering characteristics mentioned previously.

Mixing of the sludge and the precipitant with the water to be treated may be performed for any amount of time that results in sufficient precipitation of the dissolved constituents. Such dissolved constituents may precipitate into colloidal form. The amount of time sufficient for precipitation may vary depending upon the precipitant used, but, in a typical embodiment using an alkaline reagent, the minimum time required may be about 5 minutes and the total time is preferably about 20 to about 40 minutes. If sufficient mixing and precipitation time are not provided, it may adversely impact treatment efficiency due to incomplete precipitation and crystal growth. If excess mixing and precipitation time is provided, larger equipment may be required, increasing capital and operating costs. In an embodiment where the precipitant affects the pH of the water, such as where it is an alkaline reagent, the precipitation reaction may be performed in two stages, which may improve process control by minimizing the pH change in each stage. In such an embodiment, each stage may have a reaction time selected as discussed above.

Mixing a first sludge and a precipitant with the water to be treated may be performed in any manner and using any equipment capable of generating adequate mixing to allow the desired precipitation. For example, a commercial mixing vessel may be used. Mixing may be provided by an agitator, which may be any device capable of creating the desired shear rates to achieve adequate mixing. For example, the mixing may be provided by an agitator including a commercial motor-driven impeller. In other embodiments, mixing may be done in-line, possibly eliminating vessels and/or agitators. In-line mixing, in some cases supplemented by the addition of a static mixer in the line, may be use in any mixing step in the present invention.

In an preferred embodiment, mixing of the sludge and the precipitant with the water to be treated is performed using a draft tube reactor for the continuous crystallization and/or precipitation of solids. The draft tube reactor may utilize a specially designed agitator to recirculate solids within the reactor. The reactor design may permit large circulation rates of solids through a series of underflow and overflow baffles. The size of the crystal and/or precipitant may be controllable by a number of different factors including; the point at which the feed enters the unit, the means of withdrawal of the solids and the re-circulation ratio.

In some embodiments, the sludge and the precipitant may be mixed prior to being mixed with the water to be treated. In such an embodiment, the precipitant may react with the sludge and improve the results of the subsequent precipitation when mixed with the water. For example, without wishing to be limited by any particular theory, it is believed that certain precipitants, such as alkaline reagents, may interact with the surface of sludge particles, providing sites for precipitation.

Where the sludge is mixed with a precipitant prior to mixing with the water to be treated, a conventional mixer as described above may be used to provide the mixing. Any mixing time may be used as long as adequate mixing and interaction time is provided. For example, in some embodiments where the precipitant is an alkaline reagent, a minimum mixing time on the order of about 5–10 seconds is preferred. While there is no maximum mixing time, longer mixing times may lead to larger mixing vessels and increased capital costs. In one embodiment in which the precipitant is in the form of an alkaline reagent, a preferred total vessel size provides between about 2 and about 5 minutes residence time.

Whether mixed with the precipitant first, or directly with the water, any amount of sludge may be mixed with the water so long as it provides sufficient recycle solids to generate a desired settling rate. In one embodiment, the amount of sludge may be dependent upon the concentration of dissolved material in the water to be treated. In one such embodiment where the precipitant is an alkaline reagent, the amount of recycle solids may be in the range of about 5 to about 100 pounds of recycle solids per pound of solids formed in the water to be treated for a typical water. Preferably, the amount of sludge added is as low as possible to decrease the capacity required in downstream equipment, yet not so low that the desired settling rate or precipitation efficiency is compromised. Accordingly, in one embodiment using alkaline reagent as a precipitant, the preferred range of sludge added is about 10 to about 30 pounds of sludge per pound of solids formed.

Where the sludge to be mixed with the alkaline reagent and the water is recycled, it may be recycled in any manner. For example, ballast in the sludge may or may not be separated from the sludge. In an embodiment where the ballast is not separated from the sludge, a portion of the sludge generated by the process may be recycled directly back to be mixed with the precipitant and water to be treated without treatment.

The act of mixing the water to be treated with a ballast may be performed in any manner, with any material, and using any equipment that distributes the ballast as thoroughly as desired. The ballast material may be any insoluble material or materials with a particle size equal to or greater than that of the solids being treated. As used herein, a material described as "insoluble" does not dissolve appreciably in the environment to which it will be exposed over a typical usage period. In one embodiment, the ballast material may also have a density greater than the liquid and solids being treated. In some embodiments, ballast may be chemically or biologically active and may be at least slightly soluble. By way of example, ballast may include micro-sand and/or carbon particles. Preferably, ballast particles are at least 20 microns, and preferably between about 20 microns and about 500 microns, in diameter. The ballast may be added at any rate that produces the desired settling rate. Smaller amounts of ballast may result in less efficient settling, while larger amounts of ballast may increase handling costs. In one embodiment, the ballast is added at a dosage rate of about 1 to about 10 grams/liter. Ballast may be fresh (unused) material, recycled, cleaned ballast, or recycled, uncleaned ballast.

To improve subsequent flocculation, if any, and separation, the water and precipitated colloids therein may be destabilized. Destabilization may be performed in any manner that sufficiently destabilizes the water and colloids to allow adequate flocculation. For example, destabilization may be performed by adding a material, such as a coagulant, capable of destabilizing colloid particles formed during precipitation. Destabilizing the colloid particles may allow them to flocculate and settle.

In a preferred embodiment, mixing the ballast with the water and destabilizing the water and colloid particles may be performed together in a single mixing vessel. In such an embodiment, the mixing rate may be sufficient to distribute the insoluble material and the coagulant. Accordingly, it is preferred to use a relatively high mixing rate. A relatively high mixing rate may also mechanically aid destabilization. In one embodiment, the speed gradient in the mixing vessel may be approximately 1,000 $s^{-1}$ to 4,000 $s^{-1}$, and is preferably in the range of about 3,000 $s^{-1}$ to about 3,500 $s^{-1}$. The residence time for the combined ballast addition and destabilization is preferably at least one minute.

To improve separation, contaminants precipitated in the water may be flocculated. Flocculation may be performed in any manner and using any equipment that allows flocs to form as desired. In a preferred embodiment, flocculating is performed as a low energy mixing stage, which allows for the formation of large flocculated particles that may separate better. Such mixing may be performed in a mixing vessel or in-line. In one embodiment, the speed gradient for the mixing is in the range of about 300 $s^{-1}$ to about 900 $s^{-1}$. The mixing time for the flocculation may be approximately four times that of the ballast addition and destabilization.

Separating the water into clarified water and sludge may be done in any manner and using any equipment that result in a sufficiently clarified water and/or densified sludge for a particular use. The level of water clarity desired may vary with the intended use of the water and whether it is desired to minimize downstream treatment. Similarly, the density of sludge desired may vary with how the sludge is to be treated; denser sludges may be facilitate disposal with less subsequent treatment. The separation may be performed using any separator capable of separating solid from liquid. For example, the separator may be any type of conventional gravity separation unit, such as a clarifier, tube settler, inclined plate separator or any similar device. As an alternate example, the separator may be a filter or screen. In the embodiment illustrated on FIG. 5, the separator is a conventional tube settler with a bottom scraper. Because of the relatively high density and settling rates of the solids in the water, very high overflow rates may be achieved in such a system. For a typical installation, the expected range of overflow rates, using a tube settler, is in the range of about 30 to about 200 m/hr. Higher or lower rates may be achieved depending upon the water characteristics, the precipitants and ballast materials utilized, and the desired effluent and sludge quality.

Where the separator is a conventional gravity separation unit, the treated, clarified water generally discharges from the top of the separator. Conversely, the sludge is generally collected at the bottom of the separator and pumped for disposal or recycle. If desired, the sludge may be sent for disposal without removal of the ballast material. The sludge may also be used for recycle back to the alkaline reagent-mixing chamber without ballast removal, as mentioned previously. However, in the embodiment illustrated in FIG. 5, the entire sludge volume is sent through a separator. The separator separates the sludge from the ballast material. The sludge may then be either discharged, recycled back to be added with precipitant to the water to be treated, or some combination thereof. The ballast material also may be recycled back to the equipment where it is added to the water, with or without cleaning.

In embodiments where it is desired to separate the ballast from the sludge, this separation may be performed in any manner and using any equipment that produces the desired degree of separation. For example, it is possible to shear the sludge particles from the ballast particles. The sludge and ballast may then be gravity separated based upon the differences in specific gravity between the two. In the embodiment illustrated in FIG. 5, the separation equipment includes a high shear pump 319 feeding to a gravity-settling tank 320.

Such a tank may be large enough to allow the ballast material, with its higher specific gravity and settling rate, to settle, but small enough not to allow a significant amount of the sludge, with its lower settling rate, to settle. Other processes and equipment, such as a hydrocyclone, may also be used for this separation procedure.

Figure 4:
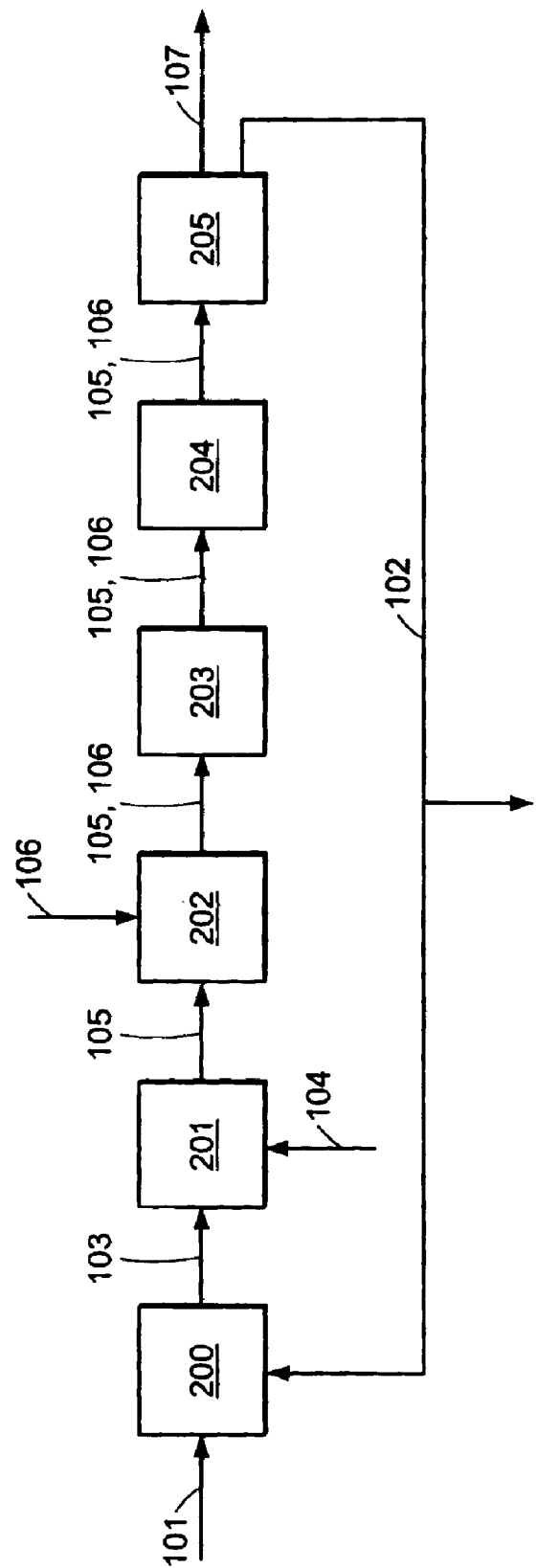
FIG. 4 is a process flow diagram of one embodiment of the present invention.

One suitable example embodiment of water treatment method according to the present invention is illustrated in FIG. 4. This embodiment of the method of the invention includes reacting 200 a precipitant in the form of an alkaline reagent 101 with sludge 102 to form a treatment slurry 103. The method also includes reacting 201 treatment slurry 103 with water to be treated 104 to form treated water and suspended solids (collectively 105). The method also includes mixing 202 treated water and suspended solids 105 with an insoluble granular material 106. The method further includes destabilizing 203 treated water and suspended solids 105 and insoluble granular material 106. The method finally includes flocculating 204 treated water and suspended solids 105 and insoluble granular material 106 and separating 205 treated water and suspended solids 105 and insoluble granular material 106 into clarified water 107 and sludge 102.

Figure 5:
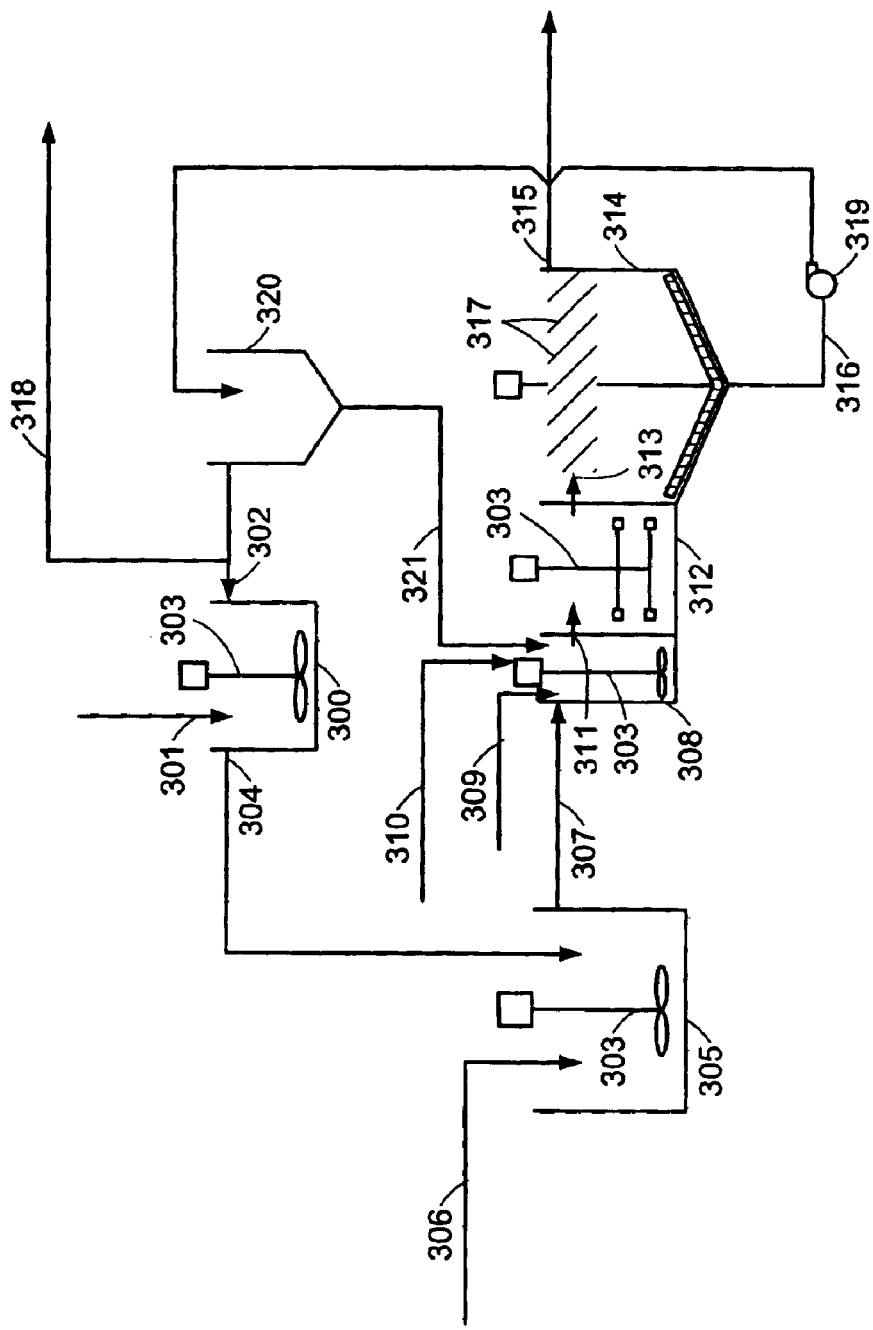
FIG. 5 is a plan view of one embodiment of the present invention.

A suitable system for carrying out the embodiment of the method of the invention described in the preceding paragraph and illustrated in FIG. 4 is illustrated in FIG. 5. This system includes an alkaline reagent mixing chamber 300 provided with an alkaline reagent inlet 301, a recycle sludge inlet 302, an agitator 303 and a treatment slurry outlet 304. A reaction chamber 305 is connected to treatment slurry outlet 304 and provided with a water inlet 306, an agitator 303 and a treated water and suspended solids outlet 307. A flash mix chamber 308 is connected to treated water and suspended solids outlet 307 and insoluble granular material outlet 321 and provided with an insoluble granular material inlet 309, a coagulant inlet 310, an agitator 303 and a treated water, suspended solids and granular insoluble material outlet 311. A flocculation chamber 312 is connected to treated water, suspended solids and granular insoluble material outlet 311 and provided with an agitator 303 and a flocculated water outlet 313. The system further includes a separator 314 connected to flocculated water outlet 313 and provided with settling plates 317, a clarified liquid outlet 315, and a sludge outlet 316. A sludge recycle is connected to sludge outlet 316, recycle sludge inlet 302, and a sludge discharge 318. The sludge recycle is includes a high shear pump 319 and a gravity separator 320 for separating sludge and ballast.

In an alternate embodiment of the present invention, sludge may be mixed with the water to be treated prior to the addition of a precipitant. For example, the sludge may be mixed with the water in a first vessel and then mixed with a precipitant/sludge mixture in a second vessel.

Having thus described certain embodiments of the present invention, various alterations, modifications and improvements will be apparent to those of ordinary skill in the art. Such alterations, variations and improvements are intended to be within the spirit and scope of the present invention. Accordingly, the foregoing description is by way of example and is not intended to be limiting. The present invention is limited only as defined in the following claims and the equivalents thereto.

What is claimed is:

1. A method of treating water or wastewater with both a ballasted flocculation process and a chemical precipitation process for removing suspended solids and contaminants, comprising:

a. directing water or wastewater having suspended solids and contaminants into a treatment area;
  b. mixing insoluble granular ballast material with the water or wastewater to form a mixture;
  c. subjecting the mixture to mixing and maintaining the insoluble granular material in suspension, and flocculating and aggregating the suspended solids and contaminants around the granular material;
  d. transferring the mixture and granular material to a sedimentation tank;
  e. settling the insoluble granular material in the sedimentation tank to form settled sludge and separating clarified effluent from the settled sludge;
  f. transferring the settled sludge from the sedimentation tank and separating the sludge from the granular material;
  g. recycling the separated granular material and mixing the separated granular material with the water or wastewater;
  h. mixing the separated sludge with an alkaline reagent to form an alkaline treated sludge and mixing the alkaline treated sludge with the water or wastewater;
  i. chemically precipitating contaminants from the water or wastewater as a result of the alkaline treated sludge being mixed with the water or wastewater;
  j. directing the water or wastewater treated with the alkaline treated sludge to the treatment area; and
  k. wherein suspended solids and contaminants are removed from the water or wastewater through both ballasted flocculation and chemical precipitation.

2. The method of claim 1 wherein the alkaline treated sludge is mixed with the water or wastewater prior to insoluble granular material being mixed with the water or wastewater.

3. The method of claim 1 wherein a coagulant is mixed with the granular material, and water or wastewater to form the mixture.

4. The method of claim 1 including mixing the alkaline reagent with the separated sludge in a first mixing tank and thereafter mixing the alkaline treated sludge with the water or wastewater in a second mixing tank.

5. The method of claim 1 wherein the water or wastewater is acidic and includes dissolved metals, and wherein the method entails precipitating at least some dissolved metals from the water or wastewater as a result of mixing the alkaline treated sludge with the water or wastewater.

6. The method of claim 1 wherein the alkaline reagent is selected from the group consisting of calcium hydroxide, magnesium hydroxide, sodium hydroxide, sodium carbonate, and mixtures thereof.

7. The method of claim 1 wherein the insoluble granular material is sand.

8. The method of claim 1 wherein the treatment area comprises a first mixing tank, a second tank and the sedimentation tank.

9. The method of claim 8 including mixing the water or wastewater with the alkaline treated sludge in a mixing tank upstream from the first mixing tank, second tank and sedimentation tank.

10. The method of claim 9 including mixing the separated sludge with the alkaline reagent in a sludge-alkaline reagent mixing tank prior to the separated sludge and alkaline reagent being mixed with the water or wastewater.

11. A method of softening water by utilizing both a ballasted flocculation process and a chemical precipitation process, comprising:

a. directing the water to be treated to a treatment area;
b. mixing insoluble granular ballast material with the water to form a mixture;
c. subjecting the mixture to mixing and maintaining the insoluble granular material in suspension, and flocculating and aggregating suspended solids and contaminants around the granular material;
d. transferring the mixture including the granular material to a sedimentation tank;
e. settling the granular material in the sedimentation tank to form settled sludge and separating clarified effluent from the settled sludge;
f. transferring the settled sludge from the sedimentation tank and separating the sludge from the granular material;
g. recycling the separated granular material and mixing the separated granular material with the water or wastewater that forms the mixture;
h. mixing the separated sludge with lime or soda ash to form a treated sludge mixture;
i. mixing the treated sludge with the water to be treated and wherein the water to be treated includes calcium and/or magnesium;
j. chemically precipitating the calcium or magnesium wherein in the case of calcium, the calcium is precipitated as calcium carbonate and in the case of magnesium, the magnesium is precipitated as magnesium hydroxide;
k. wherein suspended solids and magnesium or calcium are removed from the water through ballasted flocculation and chemical precipitation.

12. The method of claim 11 wherein the lime or soda ash treated sludge is mixed with the water prior to the water entering the treatment area.

13. The method of claim 11 wherein a coagulant is also mixed with the, granular material and water to form the mixture.

14. The method of claim 11 including mixing the lime or soda ash with the separated sludge in a first mixing tank and thereafter mixing the sludge treated with lime or soda ash with the water in a second mixing tank.

15. The method of claim 11 wherein the water is acidic and includes dissolved metals, and wherein the method entails precipitating at least some dissolved metals from the water as a result of mixing the lime or soda ash treated sludge with the water.

16. The method of claim 11 wherein the lime or soda ash treated sludge is mixed with the water prior to the water entering the treatment area.

17. The method of claim 16 wherein at least some calcium or magnesium is precipitated prior to the water entering the treatment area.

* * * * *